3,347,541
SHOCK ABSORBER BOOSTER
Jerry M. Buccino, 2040 Pelham Ave.,
Los Angeles, Calif. 90025
Filed June 14, 1965, Ser. No. 463,838
8 Claims. (Cl. 267—34)

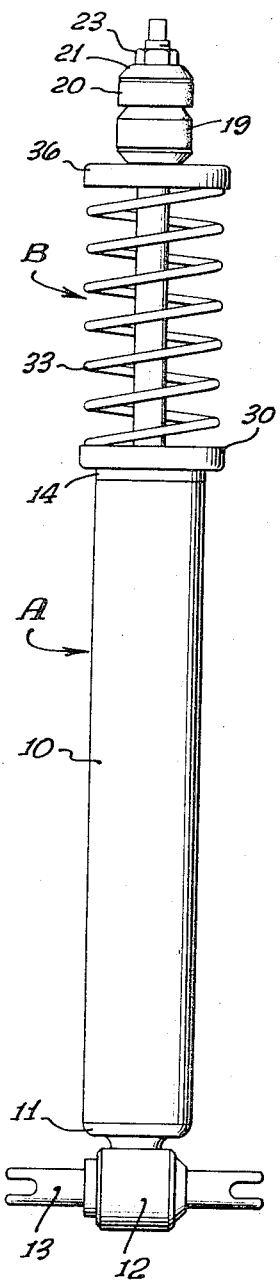
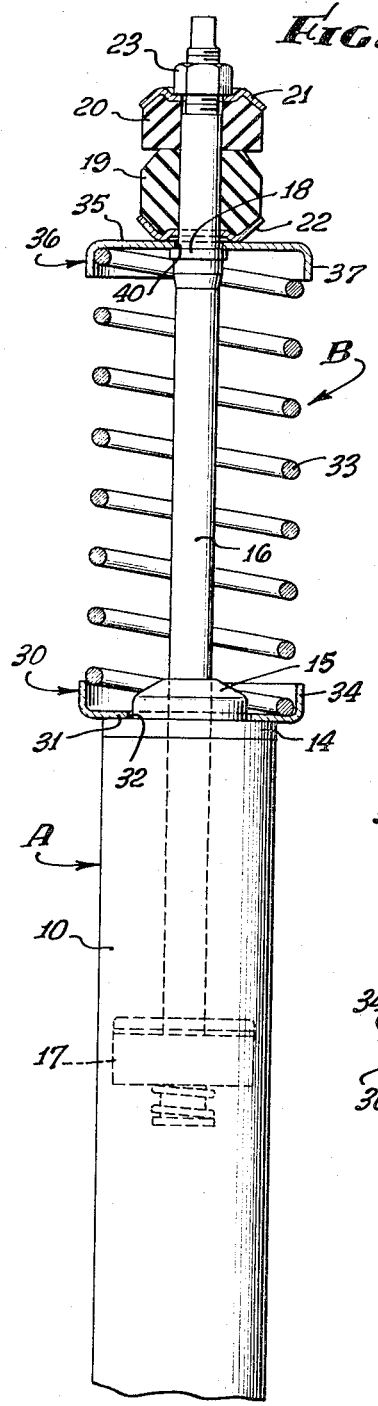
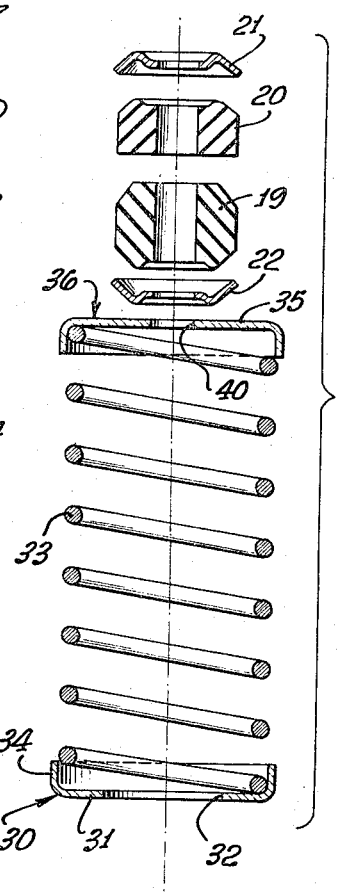

ABSTRACT OF THE DISCLOSURE

A shock absorber assembly embodying a shock absorber cylinder and piston device telescoped therein, with a piston stem extending through a cylinder end closure, a booster spring assembly being mounted on the shock absorber with spring seats bearing against the cylinder end closure and a portion of the stem, a helical spring surrounding the stem between and bearing against the spring seat with the entire spring disposed axially outwardly of the end closure.

---

The present invention relates to vehicle shock absorbers, and more particularly to shock absorbers embodying boosters for maintaining, assisting and improving the operation of existing shock absorbers.

An object of the present invention is to provide a shock absorber assembly that gives better ride control and additional stability to the vehicle by preventing front end and other vehicle sag, bottoming, rolling on sharp turns, brake dive, and wind sway.

Another object of the invention is to provide a shock absorber assembly including a booster mechanism that can be installed easily on existing shock absorbers without modifying the latter.

A further object of the invention is to provide a shock absorber assembly including a booster mechanism capable of being installed on existing shock absorbers to lengthen their operative life and restore and improve their effectiveness in securing proper relationship between the parts of a vehicle suspension system, greater vehicle stability, and better ride control.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view of a shock absorber assembly, including a shock absorber and a booster mechanism applied thereto;

FIG. 2 is an enlarged view of the upper portion of the assembly illustrated in FIG. 1, parts being shown in longitudinal section;

FIG. 3 is an exploded view of the spring or booster device, to be mounted on an existing shock absorber, and associated bushing devices for securing an end of the shock absorber to a vehicle frame.

The invention is specifically illustrated in the drawings in association with a shock absorber A designed for use at the front end of a motor vehicle. This shock absorber includes a body or cylinder 10 having a lower end closure 11 to which a bracket member 12 is secured and which receives a transverse assembly 13 for connecting the shock absorber to the wheel assembly (not shown) of a vehicle, in a known manner. The upper end of the cylinder or body 10 also has an end closure 14 which includes a circular boss 15 through which a rod or stem portion 16 of the shock absorber projects slidably, the inner end of this stem carrying a piston 17 movable in the cylinder in order to displace the hydraulic fluid therein to opposite sides of the piston during movement of the latter within the cylinder, in a known manner. The stem 16 has a flange 18. Above the flange a pair of rubber collars or bushings 19, 20 are mounted on the stem, the upper bushing 20 bearing upon an upper retainer washer 21 and the lower bushing 19 upon a lower retainer washer 22, these bushings being adapted for disposition on opposite sides of a bracket (not shown) secured to the vehicle chassis, the bushings being clamped and compressed on opposite sides of the bracket by a nut 23 threaded on the outer end of the stem, all in a known manner.

A booster mechanism B is applied to the existing shock absorber A. This booster assembly includes a lower spring seat 30 of cup shape which has a base portion 31 provided with a central opening 32 of a diameter conforming to the diameter of the boss 15, so as to fit thereover and enable the base 31 to bear against the end closure 14 of the body or cylinder 10. The lower end of a helical compression spring 33 is mounted around the rod or stem 16, bearing against the base 31 of the spring seat, the latter having an upwardly extending skirt 34 for confining and centering the lower end of the spring relative to the shock absorber cylinder 10 and its rod or stem 16. The upper end of the compression spring 33 bears against the base 35 of an upper cup-shaped spring seat 36 which is adapted to rest upon the upper surface of the stem flange 18, and which has a central opening 40 through which the stem passes of a diameter conforming to the diameter of the stem. The spring seat 36 has a depending skirt 37 facing toward the skirt 34 of the lower spring seat, which serves to confine and center the upper end of the spring relative to the stem 16. The upper spring seat base 35 bears against the lower retainer washer 22 that surrounds the stem 16 above the flange 18, this lower washer receiving the lower rubber bushing 19 mounted on the stem, which will be disposed on the lower side of the bracket or other chassis member (not shown), the upper rubber bushing 20 being mounted on the stem 16 on the opposite side of the vehicle chassis bracket and resting against the upper retainer washer 21 against which the nut 23 threaded on the stem bears. With the rubber bushings 19, 20 on opposite sides of the chassis bracket, the nut 23 can be tightened to force the base 35 of the upper cup 36 against the flange 18 and to compress the rubber bushings 19, 20 to a desired degree, but not to fully compress them, so that the bushings will still retain ample elasticity and thereby provide a yieldable connection of the shock absorber stem 16 to the bracket (not shown) of the chassis frame.

The shock absorber booster B can be mounted on the existing shock absorber A very readily. The shock absorber is removed from the vehicle and its stem 16 extended to its full length. The helical spring booster B with its opposed spring seats is then placed over the shock absorber stem 16, with the lower spring seat 30 having its large opening 32 mounted over the central boss 15 of the cylinder, and with the upper spring seat 36 with its smaller central opening 40 resting upon the stem flange 18. The metal retainer washer 22 and the rubber bushing 19 are then mounted over the threaded end of the stem 16, and such stem then inserted through the chassis bracket or other chassis member, after which the other rubber bushing 20 and metal retainer washer 21 are mounted over the stem and the nut 23 threaded on the latter and tightened to the required extent. The lower transverse assembly 13 of the shock absorber is connected to the wheel assembly of the vehicle, in a known manner.

The shock absorber A operates in its normal manner assisted by the helical compression spring 33, the latter aiding the vehicle springs in supporting the weight of the vehicle and restoring the vehicle chassis to its normal position following telescoping of the rod 16 and piston 17 within the shock absorber cylinder 10. In addition to assisting the vehicle springs in supporting the vehicle weight, the helical compression spring 23 prevents bottoming of the shock absorber, rolling of the vehicle on sharp turns, and brake dive when the vehicle brakes are applied suddenly. In general, the spring booster arrangement B gives new shock absorbers longer life and better ride control, as well as restoring weak shock absorbers, that do not leak, to a properly operating condition.

I claim:

1. In a shock absorber assembly: a shock absorber including a cylinder having an end closure provided with a central boss, a piston device telescoped in said cylinder and having a stem portion extending outwardly of said cylinder through said boss, said stem portion having a flange normally spaced longitudinally from said boss; a first spring seat bearing against said end closure and having a central opening through which said boss extends; a second spring seat bearing against said flange on the side thereof remote from said boss and having a central opening through which said stem portion extends; and a coil spring surrounding said stem portion between said seats and bearing against said seats, the entire length of said spring extending axially outwardly of said end closure.

2. In a shock absorber assembly: a shock absorber including a cylinder having an end closure provided with a central boss, a piston device telescoped in said cylinder and having a stem portion extending outwardly of said cylinder through said boss, said stem portion having a flange normally spaced longitudinally from said boss; a first spring seat bearing against said end closure and having a central opening through which said boss extends and conforming to the external diameter of said boss; a second spring seat bearing against said flange on the side thereof remote from said boss and having a central opening through which said stem portion extends, said central opening of said second seat conforming to the diameter of said stem portion and being substantially smaller in diameter than the central opening of said first seat; and a coil spring surrounding said stem portion between said seats and bearing against said seats, the entire length of said spring extending axially outwardly of said end closure.

3. In a shock absorber assembly: a shock absorber including a cylinder having an end closure provided with a central boss, a piston device telescoped in said cylinder and having a stem portion extending outwardly of said cylinder through said boss, said stem portion having a flange normally spaced longitudinally from said boss; a first cup-shaped spring seat having a first base portion bearing against said end closure and a skirt portion extending longitudinally from said base portion in a direction away from said end closure, said base portion having a central opening through which said boss extends; a second cup-shaped spring seat having a second base portion bearing against said flange on the side thereof remote from said boss and a skirt portion extending toward said skirt portion of said first seat, said second base portion having a central opening through which said stem portion extends; and a helical compression spring surrounding said stem portion between said seats with its opposite ends bearing against said base portions and disposed within said skirts, the entire length of said spring extending axially outwardly of said end closure.

4. In a shock absorber assembly: a shock absorber including a cylinder having an end closure provided with a central boss, a piston device telescoped in said cylinder and having a stem portion extending outwardly of said cylinder through said boss, said stem portion having a flange normally spaced longitudinally from said boss; a first cup-shaped spring seat having a first base portion bearing against said end closure and a skirt portion extending longitudinally from said base portion in a direction away from said end closure, said base portion having a central opening through which said boss extends and conforming to the external diameter of said boss; a second cup-shaped spring seat having a second base portion bearing against said flange on the side thereof remote from said boss and a skirt portion extending toward said skirt portion of said first seat, said second base portion having a central opening through which said stem portion extends, said central opening of said second base portion conforming to the diameter of said stem portion and being substantially smaller in diameter than the central opening of said first base portion; and a helical compression spring surrounding said stem portion between said seats with its opposite ends bearing against said base portions and disposed within said skirts, the entire length of said spring extending axially outwardly of said end closure.

5. In a shock absorber assembly: a shock absorber including a cylinder having an end closure provided with a central boss, a piston device telescoped in said cylinder and having a stem portion extending outwardly of said cylinder through said boss, said stem portion having a flange normally spaced longitudinally from said boss; a first cup-shaped spring seat having a first base portion bearing against said end closure and a skirt portion extending longitudinally from said base portion in a direction away from said end closure, said base portion having a central opening through which said boss extends and conforming to the external diameter of said boss; a second cup-shaped spring seat having a second base portion bearing against said flange on the side thereof remote from said boss and a skirt portion extending toward said skirt portion of said first seat, said second base portion having a central opening through which said stem portion extends, said central opening of said second base portion conforming to the diameter of said stem portion and being substantially smaller in diameter than the central opening of said first base portion; a helical compression spring surrounding said stem portion between said seats with its opposite ends bearing against said base portions and disposed within said skirts, the entire length of said spring extending axially outwardly of said end closure; a retainer washer through which said stem extends and bearing against said second base portion on the side thereof opposite said flange; and pliant, elastic bushing means surrounding said stem and bearing against said retainer washer.

6. In a booster spring assembly for a shock absorber having a cylinder and a piston rod reciprocable in said cylinder through a central cylinder boss provided on a cylinder end closure: a first spring seat adapted to bear against the end closure and having a central opening through which the boss can extend when the spring seat is mounted on the cylinder; a second spring seat adapted to bear against a portion of the piston rod and having a central opening through which the rod can extend; and a coil spring between and bearing against said seats, the entire length of said spring extending outwardly of the end closure when said booster spring assembly is mounted on the shock absorber with said first spring seat bearing against the end closure.

7. In a booster spring assembly for a shock absorber having a cylinder and a piston rod reciprocable in said cylinder through a central cylinder boss provided on a cylinder end closure: a first spring seat adapted to bear against the end closure and having a central opening through which the boss can extend when the spring seat is mounted on the cylinder, said opening conforming to the external diameter of said boss; a second spring seat adapted to bear against a portion of the piston rod and having a central opening through which the rod can extend, said central opening of said second seat conforming to the diameter of said rod and being substantially smaller in diameter than the central opening of said first seat;

and a coil spring between and bearing against said seats, the entire length of said spring extending outwardly of the end closure when said booster spring assembly is mounted on the shock absorber with said first spring seat bearing against the end closure.

8. In a booster spring assembly for a shock absorber having a cylinder and a piston rod reciprocable in said cylinder through a central cylinder boss provided on a cylinder end closure: a first cup-shaped spring seat having a first base portion adapted to bear against said end closure and a skirt portion extending longitudinally from said base portion in a direction away from the end closure, said base portion having a central opening through which said boss extends and conforming to the external diameter of said boss; a second cup-shaped spring seat having a second base portion adapted to bear against a portion of the piston rod and a skirt portion extending toward said skirt portion of said first seat, said second base portion having a central opening through which the piston rod is adapted to extend and conforming to the diameter of the piston rod which is substantially smaller in diameter than the central opening of said first base portion; and a helical compression spring adapted to surround the piston rod and disposed between said seats with its opposite ends bearing against said base portions and disposed within said skirts, the entire length of said spring extending outwardly of the end closure when said booster spring assembly is mounted on the shock absorber with said base portion of said first spring seat bearing against the end closure.

References Cited

UNITED STATES PATENTS

| | | | |
|---|---|---|---|
| 3,010,714 | 11/1961 | Stresnak et al. | 267—8 |
| 3,160,406 | 12/1964 | Dickinson | 267—8 |
| 3,206,184 | 9/1965 | Walker | 267—33 |
| 3,251,591 | 5/1966 | McNally | 267—34 |

ARTHUR L. LA POINT, *Primary Examiner.*

R. M. WOHLFARTH, *Assistant Examiner.*